United States Patent [19]

Beekenkamp

[11] 4,061,305

[45] Dec. 6, 1977

[54] FOLDABLE, PORTABLE SUPPORT STAND

[75] Inventor: Gerald Beekenkamp, Etobicoke, Canada

[73] Assignee: The Black and Decker Manufacturing Company, Towson, Md.

[21] Appl. No.: 728,939

[22] Filed: Oct. 4, 1976

[51] Int. Cl.[2] .......... F16M 11/38

[52] U.S. Cl. .......... 248/432; 108/118

[58] Field of Search .......... 108/118–120; 211/132; 248/164, 431, 432; 247/18, 56, 57

[56] References Cited

U.S. PATENT DOCUMENTS

| | | | |
|---|---|---|---|
| 738,993 | 9/1903 | Foote | 248/164 X |
| 1,209,679 | 12/1916 | Decker | 108/118 X |
| 3,754,786 | 8/1973 | Boucher et al. | 248/164 X |

*Primary Examiner*—James C. Mitchell

*Attorney, Agent, or Firm*—Walter Ottesen; Edward D. Murphy; Leonard Bloom

[57] ABSTRACT

A foldable, portable support stand suitable for use in portable workbenches and the like, includes a pair of substantially rigid frames. Each frame includes a spaced apart pair of tubular end legs and a spaced apart pair of longitudinally extending tubular members, the end legs and the longitudinally extending members being interconnected together to provide the frame with a rectangular outline configuration. The end legs of the frames are in a cross-over relationship with one another. Each of the end legs has a bight portion therein with the bight portions of the end legs of one of said frames being in mating relation with respective bight portions of the end legs of the other said frame. The mating bight portions define pivot joints permitting pivotal movement of said frames are in close juxtaposition with one another and an open support position wherein said frames are angularly arranged relative to one another. A housing is associated with each of the pivot joints for maintaining the bight portions in said mating relation such housing including shoulder means defining the open support position of one of the frames relative to the other.

17 Claims, 8 Drawing Figures

FOLDABLE, PORTABLE SUPPORT STAND

BACKGROUND OF THE INVENTION

This invention relates to a foldable portable support stand of a type which is especially suitable for use in portable workbenches, such as workbenches of the type including a workpiece supporting and clamping assembly as part of its basic structure.

The prior art has provided a wide variety of types of collaspsible or foldable support stands adapted to support a tray or other suitableform of table-top-like surface. Many of these structures are suitable for use as serving stands or tables for supporting dishes etc., in restaurants and the like. Typical examples of such structures may be found in U.S. Pat. No. 2,354,941 dated Aug. 1,1944 to Treitel, in U.S. Pat. No. 3,106,295 dated Oct. 8, 1963 to Berlin and in U.S. Pat. No. 2,802,578 dated Aug. 13, 1967 to Barile. A common feature of all of these structures is the provision of pairs of legs in a cross-over relationship pinned together by suitable pin means to permit the leg members to be moved relative to one another from a collapsed or folded position relative to one another to an open supporting position. The prior art also provides various arrangements wherein the support stand is integrally connected to a workbench such as in U.S. Pat. No. 1,688,533 issued Oct. 23, 1928 to Eger. In this arrangement the support legs are interconnected together by spaced apart linkage members which maintain the legs in parallelism in both the open supporting position and the folded position. A more recent development is shown in U.S. Pat. No. 3,615, 087 dated Oct. 26, 1971 to R.P. Hickman. This patent discloses a workbench arrangement including a work supporting and clamping assembly which is interconnected to a base structure by supporting members which are capable of movement between a collapsed position wherein the workbench portion is in close juxtaposition to the base structure and a working position in which the workbench is spaced from and supported above the base structure.

One disadvantage of many of the prior art support stands is that they employ a large number of moving parts e.g. pivot pins, links, etc., which tend to wear with use, thus tending to make the support stand less stable and prone to failure. Manufacturing costs, due to the large number of parts employed, tend to be relatively high. Certain of the prior art support stands are unduly bulky and thus cannot readily be stored or carried from place to place.

My copending U.S. patent application Ser. No. 665,201 filed Mar. 9, 1976 entitled "Workpiece Supporting and Clamping Apparatus" discloses an improved form of workpiece supporting and clamping assembly of a type adapted to be positioned on a support stand, table, bench or the like. This assembly includes a generally rigid base frame having a pair of elongated top members mounted on the base frame and lying in a common plane in side-by-side relationship. The top members include longitudinally extending side portions defining surfaces for the clamping of workpieces therebetween. The top members are movable along the base frame toward and away from one another. Suitable clamping means are operatively connected between one of the top members and the base frame to move such top member back and forth to an infinite number of positions along the base frame. Locator means are associated with the other top member thereby to allow it to be manually indexed to and located at any one of a plurality of predetermined positions along the base frame thereby allowing such top member to be quickly positioned relative to the first top member approximately in accordance with the dimensions of the workpiece to be clamped between the top members. The clamping means is operative to move the first mentioned top member relative to the other top member to provide the required clamping forces.

SUMMARY OF THE INVENTION

Accordingly, it is a general object of the present invention to provide an improved, foldable, portable support stand which is particularly well suited for use with the workpiece supporting and clamping assembly described above. It will be appreciated that such improved foldable support stand structure is by no means limited to use with the above described assembly but finds use in other areas as well.

Accordingly, the objects of the invention include the provision of a foldable support structure which is of a simple, sturdy construction, which is light in weight for ready portability, which is so designed as to be stable when in use, which is economical to manufacture, and which is compact to store and package.

Accordingly, the invention provides a foldable support structure comprising a pair of rigid frames, each frame having a desired outline configuration (preferably a rectangular outline) and including a spaced apart pair of end legs and at least one, and preferably two, longitudinally extending member (s). The end legs and the longitudinally extending member (s) are interconnected together to provide the desired outline configuration. The end legs of one said frame are in a cross-over relationship with the adjacent end legs of the other said frame. Each of the end legs has a bright portion formed therein with the bright portions of the end legs of one of the frames being in mating relation with the bight portions of the end legs of the other frame at the cross-over regions. The mating bight portions define pivot joints permitting pivotal movement of the frames relative to one another between a folded position (wherein the frames are generally parallel to a common plane with the longitudinally extending member (s) of one said frame being in juxtaposition with the longitudinally extending member (s) of the other frame) and an open support position (wherein the two frames are angularly arranged relative to one another with the longitudinally extending member (s) of one frame being spaced a substantial distance from the longitudinally extending member (s) of the other frame). Means are associated with each of the pivot joints for maintaining said bight portions in mating relationship and for defining the open support position of one said frame relative to the other.

The provision of the mating bight portions in the end legs affords a significant advantage over prior art structures which require drilled holes in the end legs and suitable pivot pin means to pivotally interconnect the legs together. By eliminating the need for drilled apertures and the pivot pins, an area of potential weakness is avoided and a reduction in manufacturing cost is made possible.

The longitudinally extending frame members which, in use, are lowermost, provide a substantial area for the distribution of the weight of the support stand, workbench etc., and afford a significant advantage over prior art structures wherein the support legs define only a relatively small region of support and are thus prone to sinking into the earth as, for example, when the workbench is being used out of doors. At the same time the longitudinally extending frame members which, in use, are disposed uppermost, enable the workpiece supporting assembly to be clamped thereto at any suitable location therealong.

The above mentioned means associated with each of the pivot joints for maintaining the bight portions in mating relationship preferably comprises means embracing the end legs of the frames in the region of each said pivot and having shoulder means defined thereon against which portions of the end legs bear thereby to take up laterally directed forces and to define the open support position of the frames relative to one another. This arrangement affords a significant advantage over prior art structures wherein the laterally directed components of force are taken up by the means interconnecting the support frame with the table-top-like support structure. Such structures may be prone to collapse when overly heavy loads are placed on the table-top surface.

The above mentioned means for embracing the end legs of the frames in the region of the pivot joints preferably comrpises a shell-like enclosure defined by a pair of opposed metal plates connected together and having said shoulder means formed thereon. These plates may be, for example, stamped from metal, molded in plastic, or die cast.

The end legs and the longitudinally extending members of each frame preferably comprise tubular elements connected together in telescoped mating relation.

In a preferred form of the invention each end leg is further shaped in the region of said bight portion such that the upper portion of each frame is off-set to one side of an imaginary plane relative to its lower portion whereby to accommodate said movement of the frames into the folded position in closed juxtaposition with one another.

The preferred embodiment of the support stand to be described hereinafter lends to economical manufacture in that it requires a minimum of basic components. Each of the end legs are of identical construction as are each of the longitudinally extending members. In addition, each of the pivot joint housings comprises an identical pair of members connected together to provide the funciton outlined above. Thus, the manufacturing facility need only be set up to produce three basic components. These components may be assembled together to form the completed support stand with a minimum degree of manual labour.

The above objectives and advantages of my invention will become more apparent from a consideration of the detailed description to follow taken in conjunction with the drawing annexed hereto.

DESCRIPTION OF THE PREFERRED EMBODIMENTS OF THE INVENTION

Figure 1:
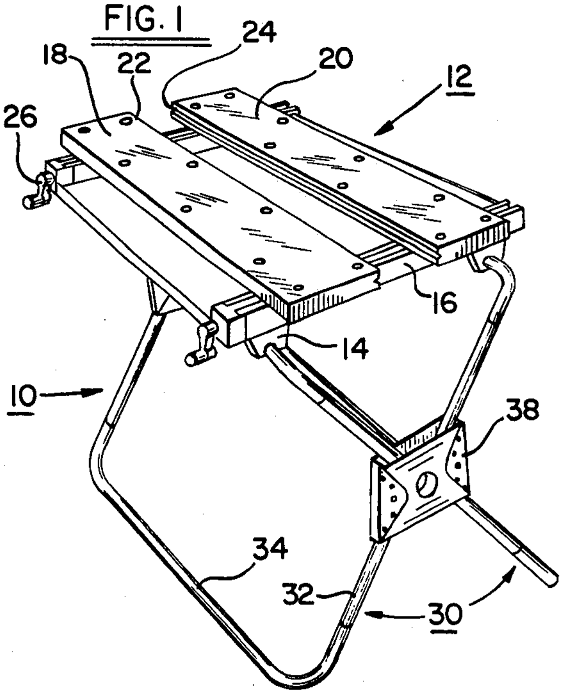
FIG. 1 is a perspective view of a foldable support stand structure in accordance with the invention having a workpiece supporting and clamping assembly mounted thereon.
Figure 2:
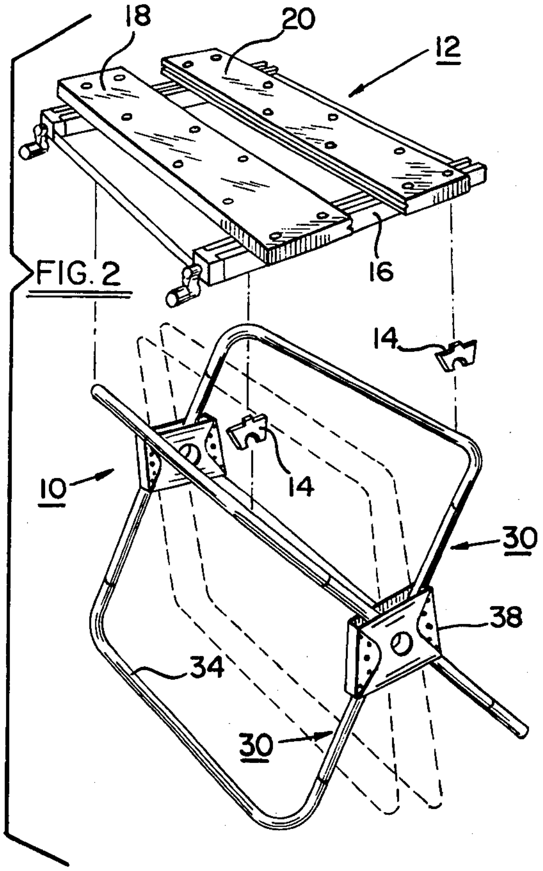
FIG. 2 is a further perspective view of the support stand with the workpiece clamping assembly separated therefrom.

With reference now to FIGS. 1 and 2 of the drawings, there is shown a foldable support stand 10 in accordance with the invention having a workpiece supporting and clamping assembly 12, as more fully described in my copending U.S. patent application Ser. No. 665,201, supported thereon. The assembly 12 may be detachably secured to the support stand 10 by means of resilient clips 14 connected to the base frame of assembly 12 and which engage the upper horizontal disposed longitudinally extending members of the support stand 10 in the manner to be herinafter described.

The workpiece supporting and clamping assembly 12 which forms the subject of the above-mentioned copending application Ser. No. 665,201 will now be briefly described. This assembly includes a generally rigid base frame 16 including a spaced apart parallel pair of elongated frame members with a pair of elongated top members 18 and 20 mounted on the spaced apart frame members and extending generally transversely thereto. The top members 18 and 20 have upper tablelike work supporting surfaces lying in a common plane and longitudinally extending opposed side portions 22 and 24 defining clamping surfaces. Extensible and retractable clamping means including screw elements actuated by means of manually operated cranks 26 are interconnected between the base frame 16 and the top member 18 for moving the latter along the frame members toward or away from the other top member 20 thereby to provide for clamping of a workpiece between such members. The other top member 20 is provided with suitable locator means (not shown) which cooperate with spaced apart apertures provided in the elongated frame members thereby to allow top member 20 to be indexed along the frame members to any one of a plurality of selected positions thereby to accommodate varying sizes of workpieces. This indexing arrangement enables the top member 20 to be quickly positioned relative to the first top member 18 approximately in accordance with the relevant dimensions of a workpiece to be clamped or secured between the top members. After top member 20 has been positioned in the desired location, the final clamping action is effected by moving the top members 18 in the desired direction by virtue of actuation of the cranks 26.

Figure 3:
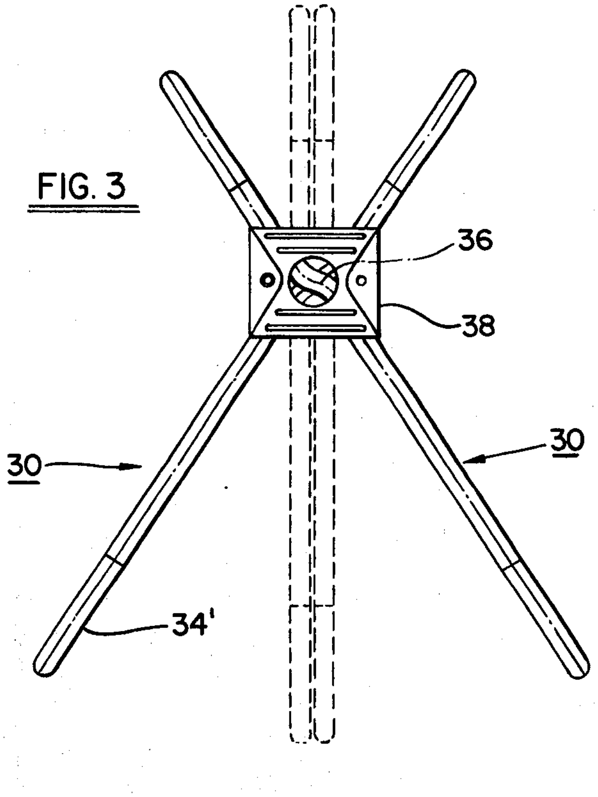
FIG. 3 is an end elevation view of the support stand.
Figure 4:
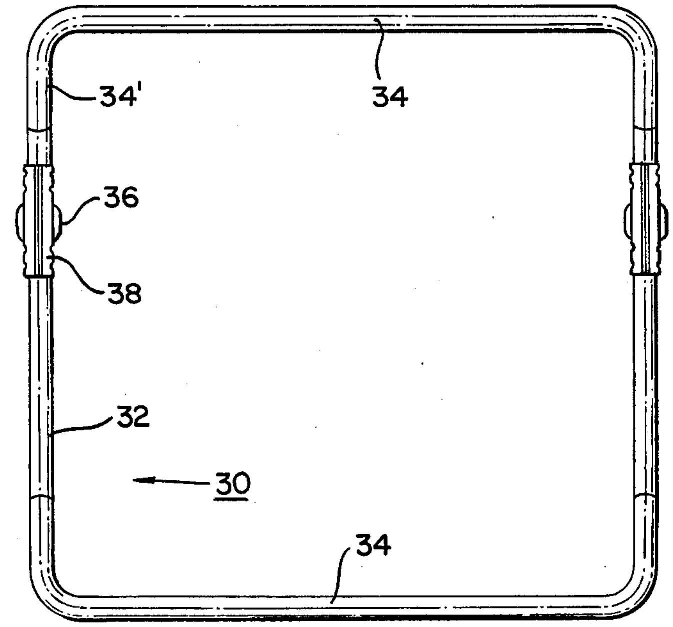
FIG. 4 is a side elevation view of the support stand.
Figure 5:
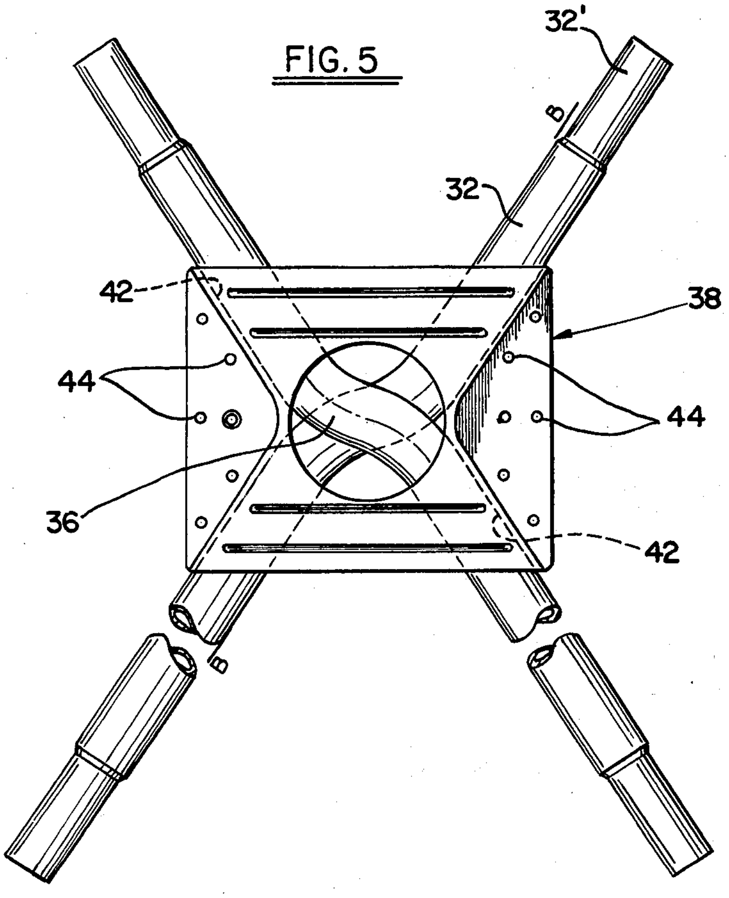
FIG. 5 is an elevation view of the end legs and the pivot joint housing assembly.

With additional reference to FIGS. 3, 4, and 5, the foldable support stand 10 will be seen to include a pair of frames 30, each frame having a generally rectangular outline configuration. Each frame includes a spaced apart pair of end legs 32 and a spaced apart pair of longitudinally extending members 34. The end legs 32 and the longitudinally extending members 34 are interconnected together to provide the above mentioned generally rectangular configuration. End legs 32 and longitudinally extending members 34 each comprise steel tubes having a wall thickness and outside diameter sufficient as to impart to the final structure the required degree of rigidity. The upper and lower longitudinally extending members 34 are identical to one another. The end legs 32 are also all identical to one another, thus reducing manufacturing costs. It will be seen that the opposing end portions 34' of the longitudinally extending members are disposed at right angles to their associated longitudinally extending members proper. The opposing ends 32' of end legs 32 are of a reduced diameter with such end portions 32' being snugly received within the above mentioned end portions 34' in telescoped mating relationship. Spot welds hold these parts firmly together. However, it is not necessary that these parts be welded since they would be held together by gravity after the stand is set up.

The end legs 32 of a first one of the frames 30 are in a cross-over relationship with the adjacent end legs 32 of the other frame 30. Each of the end legs 32 has a bight portion 36 formed therein with the bight portions 36 of the end legs of one frame 30 being in mating or interlaced relationship with the bight portions 36 of the other frame. These mating bight portions 36 serve to define pivot joints which permit pivotal movement of the frames 30 relative to one another between a folded position wherein the frames 30 are generally parallel to a common plane with the longitudinally extending members 34 of a first one of the frames being in juxtaposition with the longitudinally extending members of the other frame and an open support position wherein the frames 30 are angularly arranged relative to one another with the longitudinally extending members 34 of one frame being spaced a substantial distance from the longitudinally extending members of the other frame. The folded positions of the frames 30 are illustrated by the dashed lines in FIGS. 2 and 3.

Figure 6:
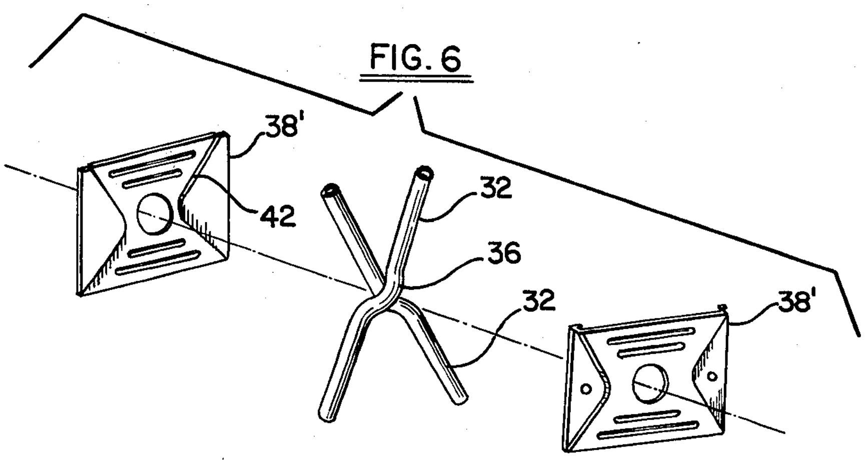
FIG. 6 is an exploded view of the pivot joint assembly and support housing therefor; and, FIG. 7 is a plan view of the mid-region of one of the end legs including the bight portion thereof.

Referring to FIG. 6, each of the pivot joints is provided with a housing 38 which embraces the end legs 32 of the frames in the region of each pivot joint. These housings 38 are adapated to maintain the bight portions 36 of the end legs in the required interlaced mating relationship and they also serve to define the open support position of one frame 30 relative to the other.

The pivot joint housings 38 each comprise a shell-like enclosure defined by a pair of opposed identically shaped sheet metal plates 38'. As already mentioned, these plates can be stamped from metal, molded in plastic or die cast. Each of these plates 38' is so shaped as to provide a generally V-shaped ledge extending inwardly from each of its opposing ends. These V-shaped ledges define internal shoulders 42 against which portions of the end legs 32 bear when the frames are in the open position whereby the shoulders 42 take up the laterally directed components of force and thereby serve to define the "open" support position of the frames. Since the internal shoulders 42 serve to take up all of the laterally directed thrust forces, only vertically directed force components are transmitted between the support stand and the clips 14 provided on the above described assembly 12. This feature greatly reduces the possibility of failure of the resilient clips 14 during use particularly when relatively heavy loads are being applied to the assembly 12.

The mating halves 38' of the housing 38 are secured together in any suitable fashion, as, for example, by spot welds 44 (see FIG. 5).

Figure 7:
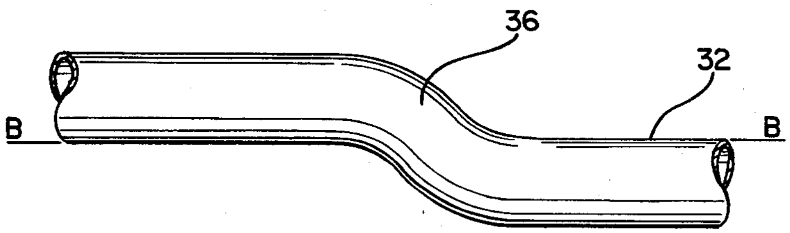
Figure 8:
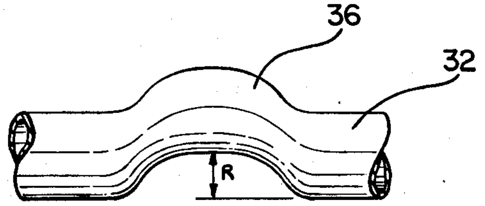
FIG. 8 is a view of the bight portion of the leg segment of FIG. 7 taken from a position 90° from that of FIG. 8.

The shape of the end legs 32 in the region of the bight portion 36 is clearly shown in FIGS. 5, 7 and 8. With reference to FIG. 8 it will be seen that the bight portions 36 are defined by a smoothly contoured portion of the end leg 32 which is off-set from the remaining portions of the end leg by a distance R equal to one-half the outside diameter of the end leg. Again, with reference to FIG. 7, which is a further view of the bight portion of the end leg taken at right angles to the view shown in FIG. 8, it will be seen that the leg portions on opposing sides of bight 36 are off-set relative to one another such that they lie on opposing sides of an imaginary plane B—B. This imaginary plane B—B is again shown in FIG. 5 and it will be seen that the upper and lower portions of each end leg 32 are off-set to opposing sides of the imaginary plane B—B; it accordingly follows that the upper portion of each frame 30 i.e. that portion above bight portion 36, is off-set to one side of an imaginary plane relative to its lower portion i.e. that portion below the bight portion 36. By virtue of this off-set relationship, the above-referred to pivotal movement of the frames into the folded position in close juxtaposition with one another is facilitated.

In use, the support stand may be carried by the user to the work site and the two frames 30 pivoted relative to one another to the "open" position. The workpiece supporting and clamping assembly 12 is then positioned over the support stand and lowered downwardly until the resilient clips 14 engage the upper horizontally disposed longitudinally extending members 34. The lower horizontally extending members 34 afford additional stability to the stand particularly when the same is being used on soft or uneven ground. It will, of course, be appreciated that the support stand may be used with various forms of workpiece supporting assemblies i.e. it is not limited to use with the specific assembly 12 as briefly described above. The support stand may also be used as a "saw-horse" as, for example, when a user wishes to provide support for pieces of timber when cutting same into shorter lengths or when cutting small logs into firewood. The support stand could also be used as a table by placing a sheet of plywood thereon. The structure will accordingly be found useful not only to the home handyman but also to construction workers etc., in a wide variety of applications.

I claim:

1. A foldable support stand comprising:

a pair of substantially rigid frames, each frame including a spaced apart pair of end legs and at least one longitudinally extending member, said end legs and said at least one longitudinally extending member being interconnected together to provide said frame with a predetermined configuration, said end legs of one said frame being in a cross-over relationship with the adjacent end legs of the other said frame, each of said end legs having a bight portion therein with the bight portions of the end legs of one of said frames being in mating relation with respective bight portions of the end legs of the other said frame to form first and second sets of mated bight portions and first and second holding means corresponding to said first and second sets of mated bight portions, respectively, for embracing and clasping the mated bight portions together to maintain said mated bight portions in said mating relation and to conjointly define therewith a pivot joint permitting pivotal movement of said frames relative to one another between a folded position wherein said frames are in juxtaposition with one another and an open support position wherein said frames are angularly arranged relative to one another, and limit means for defining the open support position of one said frame relative to the other.

2. The support stand according to claim 1 wherein said holding means associated with each of said pivot joints comprises a housing embracing the end legs of said frames in the region of each said pivot joint, and said limit means being shoulder means on said housing against which portions of said end legs bear thereby to define the open support position of said frames.

3. The support stand according to claim 1 wherein each said frame includes a spaced apart pair of the longitudinally extending members, the latter extending from one said end leg to the other and being connected to respective opposing end portions of said end legs.

4. The support stand according to claim 3 wherein said holding means associated with each of said pivot joints comprises a housing embracing the end legs of said frames in the region of each said pivot joint and said limit means being shoulder means on said housing against which portions of said end legs bear thereby to define the open support position of said frames.

5. The support stand according to claim 3 wherein each said holding means embracing the end legs of said frames comprising a shell-like enclosure defined by a pair of opposed metal plates connected together said limit means being shoulder means formed on said shell-like enclosure for supporting said end legs in said open position.

6. The support stand according to claim 3 wherein said end legs and said longitudinally extending members of each frame comprise tubular elements connected together in telescoped mating relation.

7. The support stand according to claim 6 wherein each said end leg is further shaped in the region of said bight portion such that the upper portion of each frame is off-set to one side of an imaginary plane relative to its lower portion whereby to accommodate said movement of said frames into said folded position.

8. The support stand according to claim 1 wherein each said holding means embracing the end legs of said frames comprises a shell-like enclosure defined by a pair of opposed metal plates connected together, and said limit means being shoulder means formed on said shell-like enclosure for supporting said end legs in said open support position.

9. A foldable support stand comprising:

a pair of substantially rigid frames, each frame including a spaced apart pair of end legs and a spaced apart pair of longitudinally extending members, said end legs and said longitudinally extending members being interconnected together to provide said frame with a generally rectangular outline configuration, said end legs of one said frame being in a cross-over relationship with the adjacent end legs of the other said frame, each of said end legs having a bight portion therein with the bight portions of the end legs of one of said frames being in mating relation with the bight portions of the end legs of the other said frame at the cross-over regions to form respective sets of mated bight portions, and first and second holding means corresponding to said first and second sets of mated bight portions, respectively, for embracing and clasping the metal bight portions together to maintain said mated bight portions in said mating relation and to conjointly define therewith a pivot joint permitting pivotal movement of said frames relative to one another between a folded position wherein said frames are generally parallel to a common plane with the longitudinally extending members of one said frame being in juxtaposition with the longitudinally extending members of the other frame and an open support position wherein said frames are angularly arranged relative to one another with the longitudinally extending members of one frame being spaced a substantial distance from the longitudinally extending members of the other frame, and limit means for defining the open support position of one said frame relative to the other.

10. The support stand according to claim 9 wherein each said end leg is further shaped in the region of said bight portion such that the upper portion of each frame is off-set to one side of an imaginary plane relative to its lower portion whereby to accommodate said movement of said frame into said folded position in close juxtaposition with one another.

11. The support stand according to claim 9, wherein said holding means associated with each of said pivot joints comprises a housing embracing the end legs of said frames in the region of each said pivot joint, and said limit means being shoulder means defined on said housing against which portions of said end legs bear thereby to define the open support position of said frames.

12. The support stand according to claim 11 wherein each said end leg is further shaped in the region of said bight portion such that the upper portion of each frame is off-set to one side of an imaginary plane relative to its lower portion whereby to accommodate said movement of said frames into said folded position in close juxtaposition with one another.

13. The support stand according to claim 11 wherein each said holding means embracing the end legs of said frames comprises a shell-like enclosure defined by a pair of opposed plates connected together, said limit means being shoulder means formed on said shell-like enclosure for supporting said end legs in said open position.

14. The support stand according to claim 13 wherein each said end leg is further shaped in the region of said bight portion such that the upper portion of each frame is off-set to one side of an imaginary plane relative to its lower portion whereby to accommodate said movement of said frames into folded position in close juxtaposition with one another.

15. The support stand according to claim 9 wherein said end legs and said longitudinally extending members of each frame comprise tubular elements connected together in telescoped mating relation.

16. In a foldable support stand having at least two pairs of legs and structure mutually connecting the pairs of legs to form the stand, the improvement comprising:

the legs of each pair of the pairs of legs being in a crossover relationship with each other each of the legs of the pair having a bight portion therein with the bight portions being in mating relation to each other, holding means for embracing and clasping the mated bight portions together to maintain said mated bight portions in said mating relation and to conjointly define therewith a pivot joint permitting pivotal movement of said legs of said pair relative to one another between a folded position wherein said legs are in juxtaposition with one another and an open support position wherein said legs are angularly arranged relative to one another, and limit means for defining the open support position of one of said legs of said pair relative to the other one of said legs of said pair.

17. In the foldable support stand of claim 16, each one of said end legs being shaped in the region of said bight portion such that the upper portion of each frame is off-set to one side of an imaginary plane relative to its lower portion whereby to accommodate the movement of said legs into said folded position.

* * * * *